Patented Sept. 22, 1931

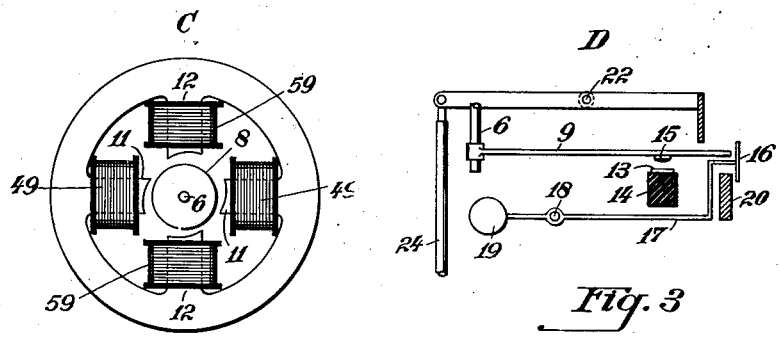
Fig. 2  Fig. 3
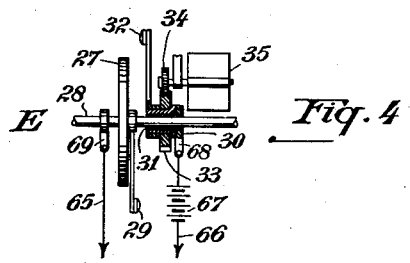
Fig. 4
Fig. 5
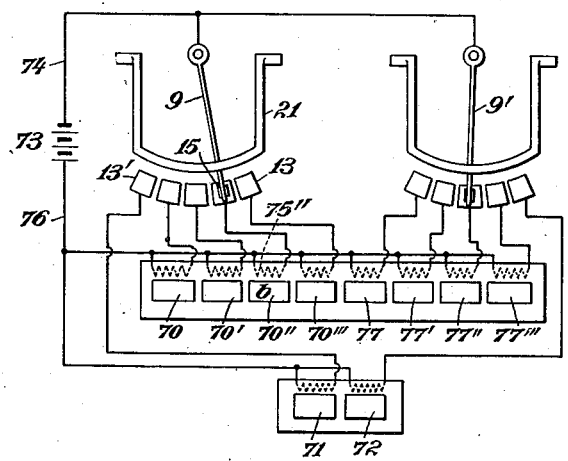

1,824,476

UNITED STATES PATENT OFFICE

WILHELM GAARZ, JOACHIM SORGE, AND MANFRED SCHLEICHER, OF BERLIN-CHARLOTTENBURG, GERMANY, ASSIGNORS TO SIEMENS & HALSKE, AKTIENGESELLSCHAFT, OF SIEMENSSTADT, NEAR BERLIN, GERMANY, A GERMAN CORPORATION

PROTECTION OF ELECTRIC LINES OR LINE SYSTEMS

Application filed April 7, 1926, Serial No. 100,461, and in Germany November 1, 1924.

The present invention relates to the protection of electric lines or line systems, and the object of the invention is an improved mechanism for this purpose.

When a defect in a line or line section under observation has occurred it is often desirable not only to switch off the line section under observation but also to know at least approximately the position of the point of defect. According to the invention the electric relays for protecting the lines or line sections are also used for ascertaining in a suitable manner the position of a point of defect.

For isolating a disturbed line or line section, electrical relays, in which the position of a pointing organ depends upon the quotient of the tension and current intensity i. e. upon the resistance of the short circuit are well known. As the resistance of the unit of length of the line conductor is well known and the resistance of the short circuit arc may be neglected generally in the first moments at least, the measurment of the resistance amounts practically to the measurement of the distance of the point of defect.

The principal object of the invention is an improved apparatus in which the position of the indicator of a measuring device of the type described is ascertained in such a manner that the range of the point of defect is also shown by special indicating means during a time, when the pointing organ of the said device has already moved to another position. It will be understood that the resistance of the short circuit changes very rapidly because the short circuit arc usually increases its length rapidly. On the other hand the electrical relays for switching off the defective line will operate a few seconds after the defect has happened. Therefore the defective line is isolated, and the said indicator moves back to its normal position.

In usuing this invention in practical installations it is of particular importance that the device for measuring the resistance should operate very exactly. This accuracy may be impaired if the torque acting upon the pointer element were used for controlling any mechanical or electrical devices. For this reason the position of the pointer is ascertained by means of an auxiliary relay which is operated immediately after the occurence of the defect. Such an auxiliary relay may be for instance a minimum tension relay, or a current relay or a relay the operation of which is also dependent upon the resistance of the line. The measuring device may, instead of measuring the quotient of tension and current intensity, measure this quotient multiplied by the cosine of the phase displacement angle, or also the quotient multiplied by the sine of the phase displacement angle. Generally it will depend upon the type of the line and its working conditions, which of these resistance values is most suitable as a measuring basis for the protective system.

A special construction of the device according to the invention is illustrated in the accompanying drawings by way of example.

Fig. 2 shows one of the driving apparatus of Fig. 1 for adjusting the indicator.

Fig. 3 is a radial section through the apparatus portion D in Fig. 1, some of the elements being shown in side elevation.

Fig. 4 shows the details of the contact mechanism E of Fig. 1 for closing the releasing circuit.

Fig. 5 is a diagram of the connections for indicating special positions of the measuring device at a distant station.

Figure 1:
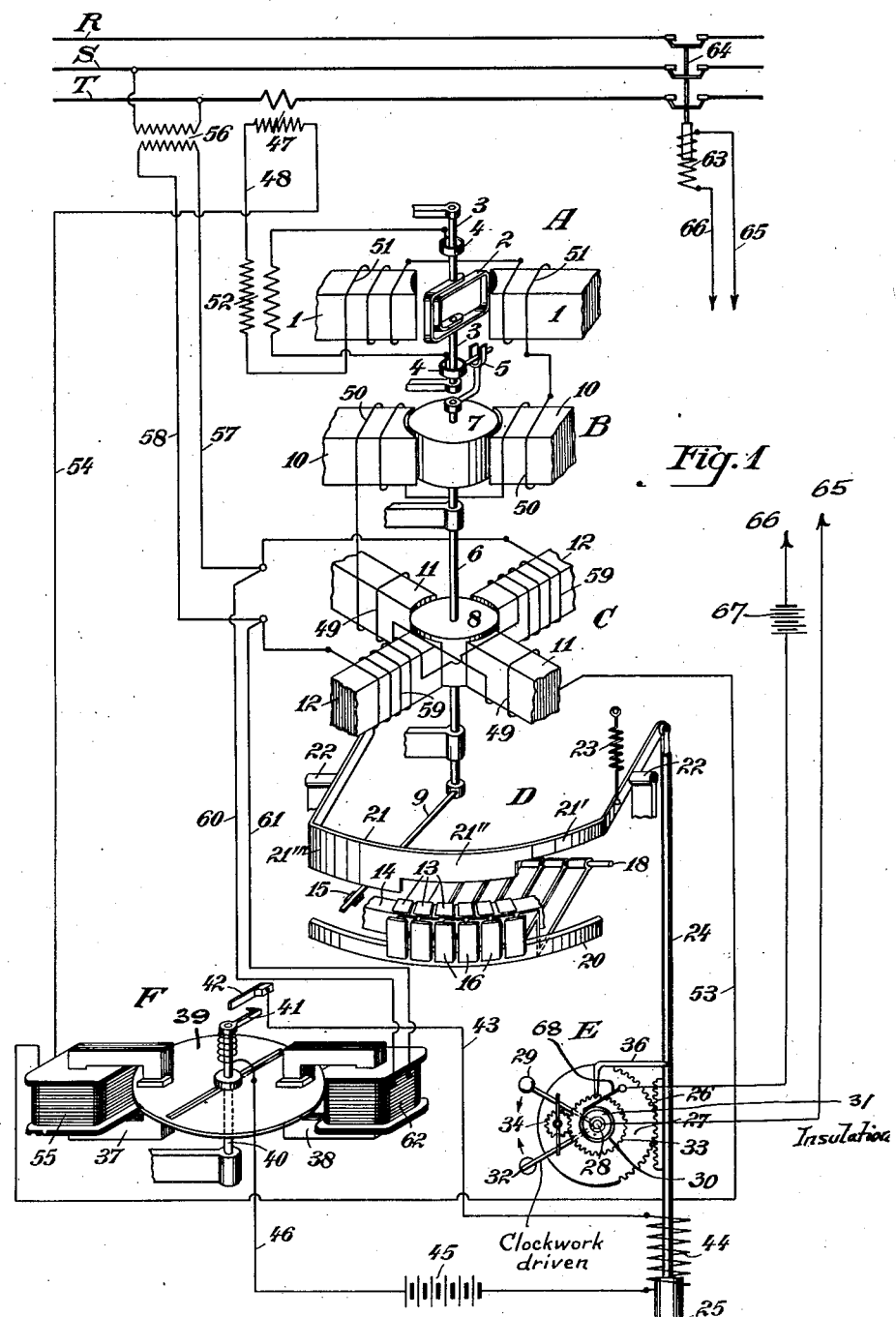
Fig. 1 is an assembly view of the essential parts of the new device and its connections to a line under observation.

In Fig. 1 the improved protective device consists of three driving devices A, B, C, operating the pointer arm 9 of an indicating device D, connected with a contact device E for closing the releasing circuit, and with an auxiliary relay F. The manner in which the protective device cooperates with the auxiliary relay F is explained in detail in the U. S. application Serial No. 186,143, filed April 23, 1927, by Manfred Schleicher, one of the joint applicants in the present application. In accordance with that disclosure it is the function of auxiliary relay F to furnish the auxiliary power for closing the contacts 41 and 42 and for actuating the auxiliary device E so that the indicator 9 of the protective device A, B, C may correctly respond, unimpaired by outside resisting forces, to indicate the correct resistance value.

The detail construction of the resistance measuring device A, B, C shown in Fig. 1 of the present application is more fully described in the U. S. Patent No. 1,677,378 granted to Dieter Albrecht, which patent discloses more particularly the damping arrangement used and referred to hereinbefore in the present application.

Referring now again to the present Fig. 1, in the magnetic field produced by an electro-magnet 1 of the driving device A, a coil 2 is disposed on a rotatable shaft 3, which carries two mercury cups 4 forming circuit connections for the coil 2. The shaft 3 is connected to a shaft 6 by means of a coupling 5. Two metallic drums 7, 8 which may be made for instance of aluminum and a pointer 9 are fixed to the shaft 6. The drum 7 is located in the field of an electro-magnet 10 and the drum 8 is influenced by the two fields of the electro-magnets 11 and 12. The construction of the two electro-magnets 11, 12 will be seen from Fig. 2. The pointer 9 is operated by the combined driving devices A, B, C and carries at its end a pointer contact 15 which moves over a contact path, which consists of separate contacts 13 fixed to a support 14. In front of the support 14 a plurality of movable tell tales 16 are arranged, which are carried on levers pivoted on axle 18. The end of one arm 17 of each lever is turned at right angles,—see Fig. 3—, while the other end is loaded with a suitable counter weight 19 for holding normally each of the tales 16 in the position shown in Figure 3. The levers on which the tell tales or stick tales 16 are supported have a certain amount of frictional resistance in their pivotal bearings, so that they may remain either in the normal position shown in Fig. 3, or in a position in which the right hand end, carrying the tale 16 is depressed. From the latter position they may be returned to normal by hand or any other suitable means known in this art. If any of the tell tales 16 are operated by the free end of the pointer 9 in a manner to be described hereafter it is pressed on the support 20. This descent of the pointer 9 and at the same time the contacting of the pointer contact 15 with one of the contacts 13 over which the pointer contact happens to be located at that time is caused by a bail 21 consisting of three sections 21', 21", 21''' stepped in widths. Normally the bail 21 which is pivoted at 22, is held in lifted position by the spring 23 so that the pointer 9 may freely swing underneath. The operation of the bail 21 is caused by the movement of a push rod 24, which carries at its lower end an iron solenoid core 25. The rack bar 26 of rod 24 meshes with a toothed wheel 27 mounted on a shaft 28 which carries on an arm a contact 29. A hollow shaft 30 insulated at 31 from the shaft 28, may be freely rotated by a clockwork 35 over a spur gearing 33, 34. Normally the clockwork 35 is mechanically locked by an arm 36 of the rod 24 engaging with the wheel 33.

The movement of the rod 24 is caused when the auxiliary relay F has closed its contact. It is of the Ferraris type. An electro-magnet 37 dependent upon the line current intensity and another electro-magnet 38 dependent upon the line voltage act jointly upon a slotted disc 39 which rotates on a shaft 40, which shaft also carries a contact 41. The contact 41 and a fixed contact 42 are arranged in a circuit including a battery 45, solenoid 44 and wires 43, 46.

In Figure 1 a line section R, S, T to be protected is shown. The secondary of a current transformer 47 having its primary winding in the line, is connected in a circuit including wire 48, the primary winding of a transformer 52 and the exciting coil 51 of the magnet 1, the exciting coils 50, 49 of the magnets 10, 11, a wire 53, the exciting coil 55 of the magnet 37 and a wire 54. The secondary winding of the current transformer 52 feeds through the mercury cups 4 the movable coil 2, which consists of about a single turn because the secondary current intensity of the transformer 52 is higher than its primary intensity. A voltage transformer 56 is inserted between lines S, T. Its secondary winding is connected through wires 57, 58 to the exciting coil 59 of the magnet 12 and through wires 60, 61 to magnetizing coil 62 of the magnet 38. The releasing coil 63 controlling the section switch 64 is in circuit with a battery 67, Fig. 4, the poles of which are connected to the contacts 29, 32 through the slip-rings 68, 69 and the shafts 30, 28.

The device operates as follows:

As soon as a defect occurs in the line, the tension falls and the current distribution is changed. Therefore torques are produced in the driving devices A, B, C and in the auxiliary relay F. The instrument A rotates its shaft 3 proportional to the square of current intensity, while at the same time in the drum 8 of the device C a torque proportional to the product of tension and current intensity is produced.

The device B which only has a damping effect brakes its drum 7 proportional to the current intensity. The pointer 9 is adjusted according to the resulting torque produced by the actions of the devices A and C, which are oppositely directed. Experiments have shown that by the braking effect of the device B the pointer 9 will move in a very short time and very exactly into that position, which corresponds to the quotient of tension and current intensity. This position measures as explained above also the distance of the defect in the line. Other damping means, of course, instead of or together with the electrical device B may be employed as for instance well known mechanically actuating devices or a brake.

After having reached the position which corresponds to the distance of the defective point from the point of measurement, the pointer 9 is pulled down by the descending bail 21. Consequently the free end of the pointer 9 presses the movable tell tales 16 over which it lies, down onto the support 20, and the pointer contact 15 simultaneously touches the corresponding contact 13 (Fig. 3). The depressed tell tales 16 carrying a suitable legend will thus give the distance of the point of defect while all the other movable tell tales remain in their zero positions. The closure contacts 15, 13 actuate distant signals as will be described later on.

The operation of the bail is caused by the closing of contacts 41, 42 of the auxiliary relay F, which occurs as soon as the defect has occurred, because the field coils 55 and 62 of the Ferraris device F are connected to the current transformer 47 and to the tension transformer 56 respectively, and the disc 39 begins to rotate the contact 41 about its axis. If the contacts 41, 42 are closed the circuit of the solenoid 44 is fed from the battery 45. Therefore the excited coil 44 attracts its core 25 and the rack bar rod 24 is moved upwards, whereby the bail 21 is rocked about pivot 22 and causes the pointer 9 to operate as mentioned above.

At the same time the adjustment of the rack 26 on rod 24 operates the contact 29 through the gearing 26, 27 about the shaft 28. The contact descends immediately down to a predetermined position which depends upon the distance which rod 24 moves, and after some time the contact touches the contact 32 which is rotated in opposite direction about the hollow shaft 30 at constant speed by the action of the clockwork 35 as soon as the locking pawl 36 engaging wheel 33, has released the clock train. By the closing of contacts 29, 32 the following circuit becomes operative: battery 67, (Fig. 4), slip-ring 68, hollow shaft 30, contacts 32, 29, shaft 28, slip-ring 69, wire 65, main switch releasing coil 63, (Fig. 1), through wire 66 back to battery 64. The excited releasing coil 63 therefore switches off the line section under observation.

In order to make the releasing time definitely dependent upon the actual position of the pointer 9 and thereby upon the distance of the point of defect, the bail comprises two, three or more differently stepped sections 21′, 21″, 21‴. As for instance the pointer 9 lies below the bail section 21′, that position corresponds to a small resistance and to a short distance of the defective point, the bail descends much further before it strikes pointer 9, than it would if the pointer were located below sections 21″ and 21‴. This results from the different distances between the lower side of sections 21′, 21″, 21‴ or the support 14. Accordingly the contact 29 is also brought into one of three different positions which thus also depend upon the position of the pointer 9. If the pointer 9 lies below the sections 21″ or 21‴, the contact 29 does not descend as much and therefore the time elapsed before the contact 29 meets contact 32 is longer. These different releasing times dependent upon the distance of the defective point are of particular importance for an accurate working of the protective devices distributed over the whole line system and generally an undesired switching off will not occur.

All indicating elements shown in Fig. 1, except the depressed stick tale 16 automatically return into their normal positions as soon as the defective line has been switched off or the defect is remedied otherwise. The depressed stick tale 16, as previously described, having sufficient friction in its lever bearing, remains depressed until raised by hand to normal position.

Fig. 5 illustrates the transmission of the indications of pointer 9 from the measuring device to a distant place. It is supposed that the pointer 9 moves over the several contacts 13 without at first touching them if a defect occurs altogether away from the line section under observation. If a defect happens in the neighbouring section, here assumed to be left of the section immediately under observation the pointer 9 lies over contact 13′. If in the position shown in Fig. 5 the indicator 9 is pressed down by means of the bail 21 in the manner described above (which shows that the defect is within the line section) a contact takes place between the pointer contact 15 and the second contact piece 13, which closes a circuit running from the battery 73 over the wire 74, the pointer 9, the contacts 15, 13, the coil 75″, the wire 76 and back to the battery. The coil 75″ operates its moving signal 70″. The signals 70—70‴ may be represented by numbers, letters as in Fig. 5 or also by kilometre figures or numbers, which only appear when the signal is operated. The moving signal 70″ indicates that the defect point lies in the portion $b$ of the section under observation. The whole section under observation is divided into a plurality of parts, for instance four parts $a, b, c, d$ and each moving signal denotes one of these parts. If as aforementioned upon the descent of bail 21, the pointer 9 with its contact 15 lies over the contact piece 13′, the defect is outside of the left line section under observation in some other section. The contact produced then actuates a special movable signal 71.

If several line sections are to be observed from a single point, it is advisable to embody the movable signals (such as 16 in Fig. 1) for all these line sections in a common switch-board. Fig. 5 indicates an example of this type. The movable signals 77, 77′—77′′′ serve to indicate a defective point in another line section to the right of the one supervised by pointer 9, being itself supervised by pointer 9′ belonging to a second independent measuring device which is of the same type as that of Fig. 1 and having its current and voltage transformer connected into that other section. A movable signal 72 arranged near the signal 71 shows that the defect point is not within the right line section when the pointer 9′ stands on the extreme right hand contact.

In the illustration the switching is so arranged that generally one signal only moves at the utmost two, if the indicator stands exactly between two contact pieces. The arrangement, however, can also be carried out in such manner that all signals move up to the signal provided for the defect point. They may be replaced by lamps or other optical or acoustical signalling devices.

What we claim as our invention and desire to secure by Letters Patent is:—

1. Arrangement for perceptibly supervising the condition of an electric line section comprising a measuring instrument indicating the quotient of the prevailing line voltage and line current, a relay connected to the line to respond to a change in the line condition, a pointer on said instrument and a plurality of movable stick tell tales extending along the pointer path and denoting corresponding sections of an electric line, means controlled by said relay for depressing said pointer and forcing it against one of said tell tales to give a permanent indication of the particular line section affected.

2. Arrangement for perceptibly supervising the condition of an electric line section comprising a measuring instrument indicating the quotient of the prevailing line voltage and line current, a relay of the Ferraris type, having a disc and a contact operated by said disc and two oppositely acting systems for operating said disc, one system being excited by the current in the line, the other being connected across the line to respond to the varying line potentials, a pointer on said measuring instrument and a plurality of movable stick tell tales extending along the pointer path and denoting corresponding sections of an electric line, and adapted to give a permanent indication of the particular line section affected when the pointer in its assumed position is forced against one of said tell tales, and a solenoid-controlled bail extending over the pointer path, and an energizing circuit for the solenoid, controlled by said relay contact for depressing said pointer by said bail in the direction of said tell tales, said bail being stepped to lengthen or shorten its stroke required for the depression of the pointer according to the position of the latter, a line switch and means, controlled by said bail for timely releasing said switch in accordance with the length of the bail stroke.

3. Arrangement for perceptibly supervising the condition of an electric line section comprising a measuring instrument indicating the quotient of the prevailing line voltage and line current, a relay of the Ferraris type, having a disc and a contact operated by said disc and two oppositely acting systems for operating said disc, one system being excited by the current in the line, the other being connected across the line to respond to the varying line potentials, a pointer on said measuring instrument and a plurality of movable stick tales extending along the pointer path and denoting corresponding sections of an electric line and adapted to give a permanent indication of the particular line section affected when the pointer in its assumed position is forced against one of said tell tales, and a solenoid-controlled bail extending over the pointer path, and an energizing circuit for the solenoid, controlled by said relay contact for depressing said pointer by said bail in the direction of said tell tales, a line switch and an operating circuit therefor, including a timed contact device having a uniformly moving contact and a variably fixed contact, said bail being stepped to lengthen or shorten its stroke required for its depression of the pointer according to the position of the latter, means connected with said bail for varying the position of said fixed contact in accordance with the stroke of said bail, and means for releasing said uniformly moving contact by the operation of said bail for timely varying the opening of the line switch in accordance with the pointer position.

4. Arrangement for perceptibly supervising the condition of a line section comprising a measuring instrument indicating the quotient of the prevailing line voltage and line current, a relay connected to the line and adapted to respond to a change in the line condition, a pointer on said measuring instrument and means actuated by said responding relay and including said pointer for permanently indicating the position of the latter at the time of response of said relay.

5. Arrangement for perceptibly supervising the condition of a line section comprising a measuring instrument indicating the quotient of the prevailing line voltage and line current, a relay connected to the line and adapted to respond to a change in the line condition, a pointer on said instrument and a plurality of stick tell tales and actuating contact means extending along the pointer path for denoting different sections of an electric line, and a plurality of electromagnetic means correspondingly actuated by said contacts, a solenoid-controlled bail extending over the pointer path for depressing said pointer and the stick tell tale and closing contact over which the pointer happens to stand, the actuated electromagnetic means being operated by said responding relay for permanently indicating the line section affected at the time of response of said relay.

In testimony whereof we affix our signatures.

WILHELM GAARZ.
JOACHIM SORGE.
MANFRED SCHLEICHER.